Aug. 29, 1939. L. H. AMDUR 2,170,957
KEYLESS LOCK DEVICE
Filed March 4, 1939 3 Sheets-Sheet 1
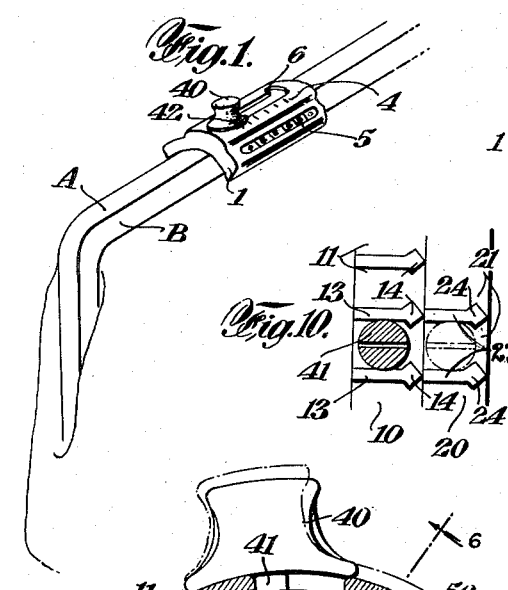
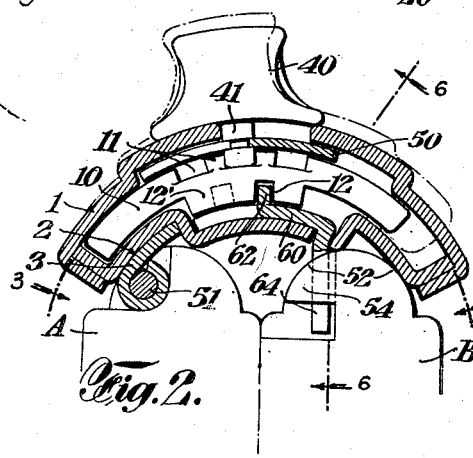
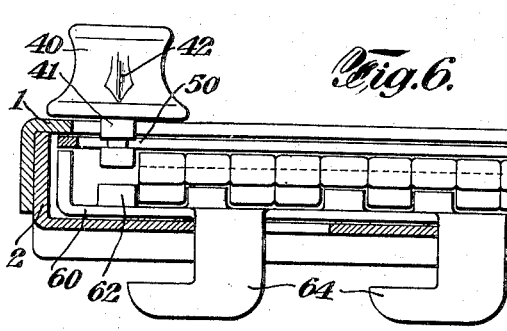
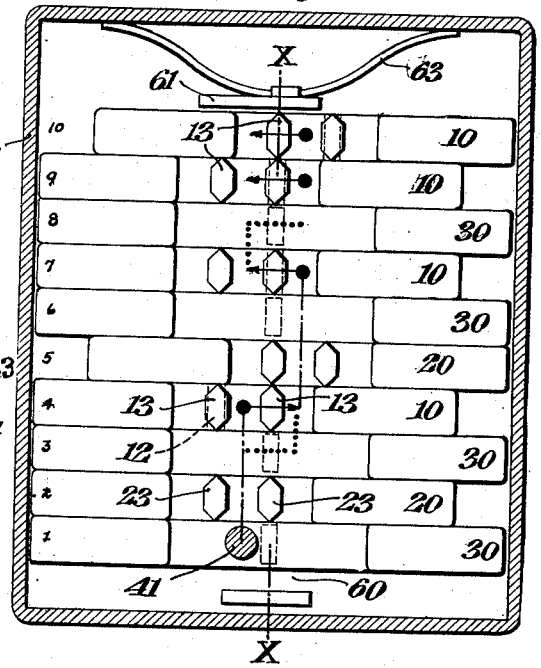
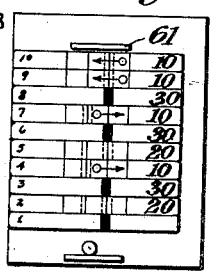
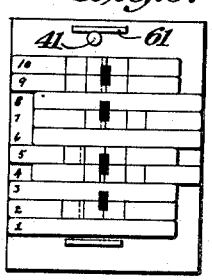
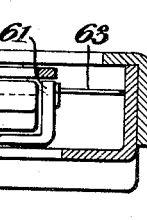
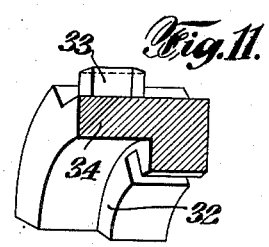
INVENTOR
Leon H Amdur Aug. 29, 1939. L. H. AMDUR 2,170,957
KEYLESS LOCK DEVICE
Filed March 4, 1939 3 Sheets-Sheet 2
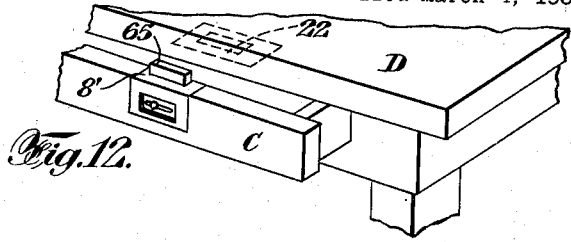
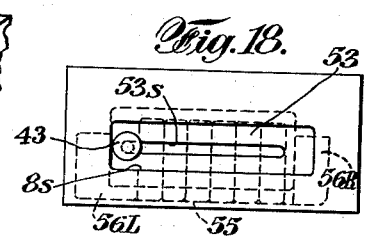
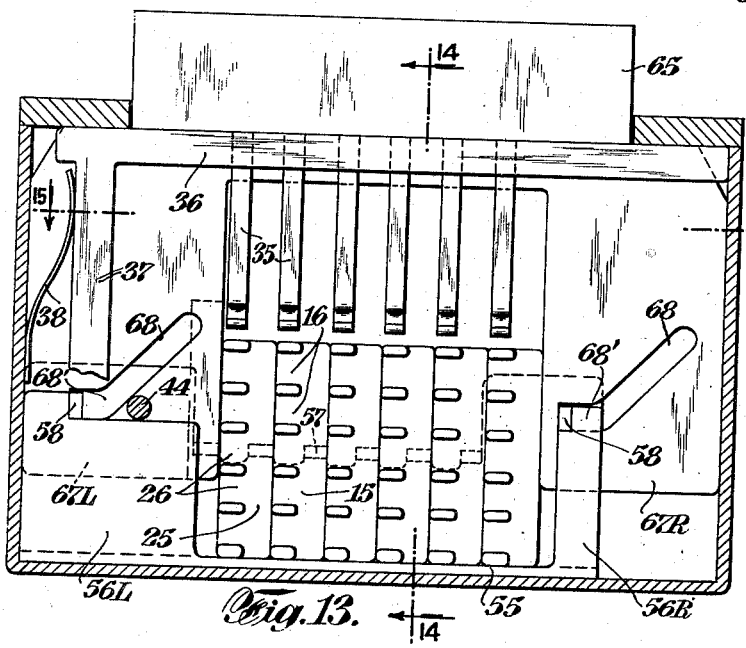
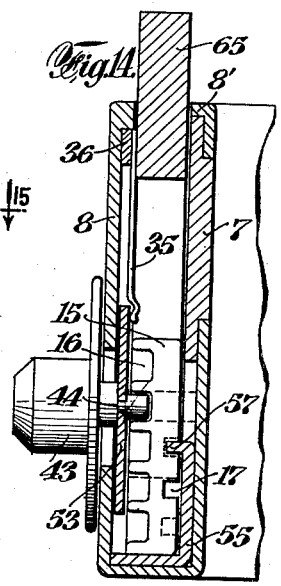
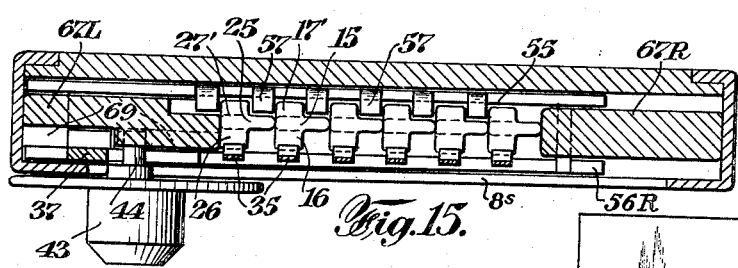
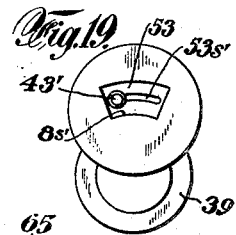
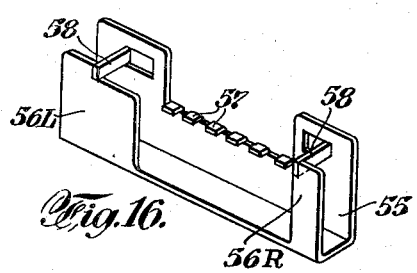
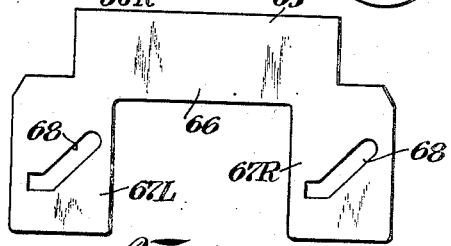
INVENTOR
Lem H. Amdur Aug. 29, 1939.    L. H. AMDUR    2,170,957
KEYLESS LOCK DEVICE
Filed March 4, 1939    3 Sheets-Sheet 3

INVENTOR
Leon H. Amdur

Patented Aug. 29, 1939

2,170,957

UNITED STATES PATENT OFFICE 2,170,957

KEYLESS LOCK DEVICE

Leon H. Amdur, Brooklyn, N. Y.

Application March 4, 1939, Serial No. 259,750

29 Claims. (Cl. 70—57)

This invention relates to a keyless lock mechanism in which there is provided a plurality of tumblers arranged in side by side relation and adapted to be adjusted to different collinear positions and a manipulative member adapted to be selectively aligned with the tumblers to adjust them to selective collinear positions, the lock mechanism being operable when the tumblers are adjusted in pre-determined positions corresponding to the particular "combination". Other objects of the invention include an arrangement of the character described in which the manipulative member or slider is unremovably associated with the mechanism; an arrangement in which the manipulative member or slider is adapted to operate the latch of the lock mechanism when the said tumblers have been arranged according to the pre-determined combination; an arrangement in which the slider is always freely movable to adjust the tumblers and is further movable to operate the latch only when the tumblers have been set to the proper combination; the provision in the arrangement of the character described of means for "cutting out" the tumblers, so that the slider or manipulative member may operate the latch independently of the tumblers; a simple arrangement or form of the invention adapted to be used on ladies pocket-books, bags, suitcases, brief cases and the like, in which the arrangement includes clasp means for the receptacle; a simple arrangement or form of the invention adapted to be used for furniture drawers, cabinets and the like; an arrangement or form of the invention applied to a door lock mechanism, in which the door knob functions as the manipulative member in adjusting the tumblers, the knob being angularly turned to successive or selective tumblers which are collinearly adjusted by pulling the knob forwardly or pushing the knob rearwardly; an arrangement in which the tumblers are adapted to be haphazardly disarranged to destroy the combination by movement or jarring (best adapted to the form of the invention used in connection with handbags, suitcases and the like); an arrangement in which the tumblers are adapted to fall by gravity to a normal rest position in which the combination is destroyed (this is shown and described in connection with the form of the invention applied to a desk drawer or the like); an arrangement in which the tumblers are adapted to be brought by a pair of centering springs to a central, normal position in which the combination is destroyed (this is shown and described in connection with the form of the invention applied to a door lock mechanism).

For the attainment of these and such other objects as may hereinafter appear or be pointed out, I have shown a number of forms of my invention on the accompanying drawings, wherein Fig. 1 is a perspective view of a handbag provided with the permutation lock of my invention;

Fig. 2 is a cross section of this lock;

Fig. 3 is a plan view taken on the lines 3—3 of Fig. 2;

Figs. 4 and 5 are diagrammatic showings of the element positions, Fig. 4 showing them in locked condition and Fig. 5 showing them aligned in position for opening;

Fig. 6 is a longitudinal sectional view taken on the lines 6—6 of Fig. 2;

Figs. 7, 8 and 9 show the tumbler, dummy, and spacer elements, respectively;

Fig. 10 is a detail showing of the slider click or detent;

Fig. 11 is a fragmentary perspective of an element combining the functions of the tumbler, dummy and spacer;

Fig. 12 is a perspective view of a table drawer provided with the permutation lock of my invention;

Fig. 13 is a longitudinal front section of this lock;

Fig. 14 is a side section thereof;

Fig. 15 is a sectional plan of the lock;

Fig. 16 is a perspective view of the actuator cradle;

Fig. 17 is a front view of the bolt plate;

Fig. 18 is a front view of the lock;

Fig. 19 shows the invention applies to a padlock;

Figure 20:
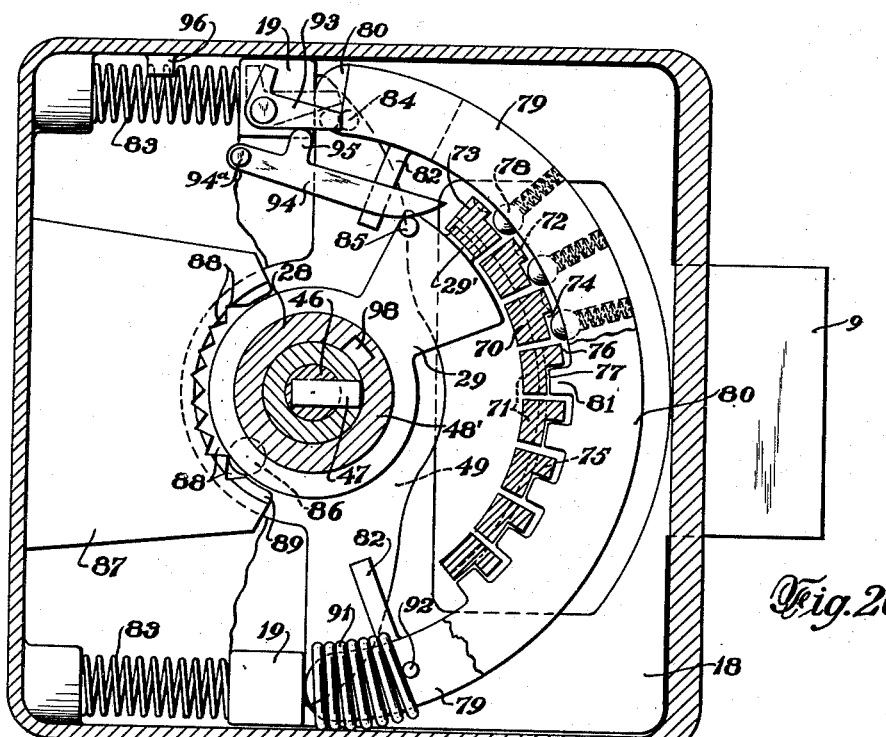
Fig. 20 is a front sectional view of a door mechanism embodying the invention taken on the line 20—20 of Fig. 21.

The form of this invention shown in Figs. 1 to 11 is particularly adapted as a permutation lock closing means for such things as pocketbooks, suitcases, valises, satchels, briefcases, bags, trunks, locked diaries, treasure boxes, etc.; the invention is shown in the said figures in connection with a pocketbook.

The lock means of this invention is contained within a casing comprised of an upper plate 1 and a lower plate 2 which are conveniently rested within each other and secured together in the manner clearly seen in Fig. 2. The casing itself serves as a catch and is pivoted on a pin or pins 51 secured to frame A of the pair of pocketbook frames A and B, by means of a spring member 3, which urges the casing or clasp (on pivot 51) in a clockwise direction (as viewed in Fig. 2) with the inner distal portion of the clasp pressing top cam portion 52 of frame B leftward in closing contact with frame A as shown in solid lines in Fig. 2. With the lock latch 64 in open position, as will be fully described subsequently, the clasp is cammed upwardly to the dot-and-dash position by the outward opening movement of frame portion 52. In closing the bag, cam portion 52, in a similar manner, cams the clasp or casing 1 upwardly until frame B reaches closing position as shown in the figure, whereat the clasp snaps on the outer side as shown to maintain the bag closed.

Within the casing are contained a number of elements which have been termed as follows: "tumblers", designated 10 and shown in Fig. 7; "dummies", designated 20 and shown in Fig. 8; "spacers", designated 30 and shown in Fig. 9. These elements are arranged longitudinally within the casing, see Fig. 3, in a manner which will be fully described subsequently. In the upper edge and centrally and symmetrically positioned in the tumblers 10 and the dummies 20 are a plurality of pockets, respectively 11 and 21, formed by partitions or cut out in the edge of the elements; as shown, there are three tumbler pockets 11 and three dummy pockets 21, the number of pockets depending upon the design and movement of the elements and other part, as will be seen. In the spacer 30, there are no corresponding pockets, but instead, a large gap 31. Longitudinally traversable through one or the other of the tumbler pockets 11 or dummy pockets 21 (depending upon the transverse position of these elements, as will be seen) and through the gap 31 of the spacers, is a pin 41 depending from a slide member 40. The slide member 40 is in the form of a button or knob slidable along the top of upper casing plate 1 of the lock, its pin 41 clearing through a longitudinal slot or opening in the upper plate. This opening is sufficiently wide to permit a slight extent of transverse movement of the slider 40 (to left and right in Figs. 2, 3, 4 and 5) which movement the slider may have in addition to its longitudinal movement (along the long axis in Figs. 3, 4, 5 and 6). For the purpose of closing the casing at the rather wide slot in its upper plate and for the purpose of conveniently anchoring the slider 40 against removal (yet permitting its longitudinal and transverse movements as already mentioned), there is provided a shield 50. Shield 50 has a longitudinal slot but very much narrower than the longitudinal slot or opening in the casing top plate. Conveniently, slider pin 41 is shouldered to fit in the said shield slot, thereby becoming anchored against removal, see Fig. 2. The shield has no movement in a longitudinal direction, but is sufficiently narrow, see Fig. 2, so that it can be moved to a slight extent transversely. That is, the slider moves longitudinally in the shield slot without moving the shield, but when moving transversely, moves together with the shield. The elements (e. g., the tumbler element 10 shown in Fig. 2) are somewhat shorter in length than the transverse width of the casing, so that these elements have an extent of transverse movement.

At the bottom edge of the tumbler elements is provided a dependent barrier wall 12', Fig. 7 having a cut out 12 which is located to one or the other side of center depending upon the "combination" of the lock as will be more fully described presently. It should be noted that neither the dummy 20 (Fig. 8) or spacer 30 (Fig. 9) has a barrier plate. Associated with the tumblers, or rather the cut outs 12 thereof, are a plurality of latch fingers 62 projecting upward, see Fig. 2, from a longitudinal disposed latch bar 60. Latch bar 60 extends longitudinally in the casing and has a slight extent of longitudinal movement. As clearly seen in Figs. 2 and 3, the fingers of the latch bar are centrally located. Hence, only when the tumblers 10 are properly, transversely positioned—in accordance with the combination—so that their cut outs 12 are aligned on the longitudinal axis, can the latch fingers pass through the barrier cut outs to permit a movement of the latch bar (to open the lock, as will be seen).

The latch bar is further provided with one or more (two being shown in Fig. 6) depending hook latches 64, passing through slots in the lower casing plate as shown, which cooperate with overhanging ledges 54 of the frame B, see Fig. 2. A flat spring 63 is provided in the casing at one end of the latch bar to normally maintain it in a direction (to the left as viewed in Fig. 6) to keep its fingers 62 away—to the left in the figure—from the barrier plate (or cutouts) of the tumblers. Hence, the tumblers are normally free to move transversely, to break up or destroy the alignment of the tumbler cutouts. The movement of the pocketbook or suitcase or the like to which the lock is applied, as by walking or laying the bag down, etc., is sufficient to destroy the cut out alignment and lock the device.

The latch bar is further provided with an upstanding lug 61 contactable by pin 41 of the slider. In the "locked" condition of the latch bar, its fingers 62 being blocked by the barrier walls of the tumblers, the slider cannot move the latch bar; only when the tumblers are properly transversely positioned (by the slider, as will be more fully described) can the slider move the latch bar, in a direction (against spring 63) to open the lock by moving latches 64 clear of ledges 54, Fig. 2.

The number and arrangement of tumbler, dummy and spacer elements depend upon the particular "combination" desired. Merely to aid in the description of the invention, there are shown ten elements (four tumblers 10, two dummies 20 and four spacers 30). For convenience each element or position is numbered from 1 to 10 consecutively (upwardly on the sheet, Fig. 3). We will assume that the device is locked, i. e., the fingers 62 of the latch bar 60 which is pressed downwardly, Fig. 3, by spring 63, as aforesaid) cannot enter cut outs 12 of the tumbler elements. In other words, in the locked condition the cut outs 12 of the tumblers are not aligned on the longitudinal axis, so that the barrier walls of the tumblers block movement of the latch bar. The slider (represented by its pin 41) is started from position "1" and is moved upwardly, Fig. 3. The slider has, as already stated, a transverse movement in addition to its longitudinal movement; in the illustration shown, the slider has two transverse positions: a "left" position, in which its pin 41 abuts the left edge of the casing slot (as shown in Fig. 2) to the left of the center or longitudinal axis, and a "right" position abutting the right edge of the slot.

The first element (position "1") is—at least in the illustration—occupied by a spacer 30, which has a wide gap 31, see Fig. 9, so that the slider may be readily moved transversely at all times. The particular "combination" of the illustraion we will assume is such that the slide starts its movement from the "left" position, i. e., it is moved longitudinally along the left edge of the casing slot. The next element (position "2") is a dummy 20 which is followed (position "3") by a spacer 30, the fourth (position "4") is a tumbler 10.

It will be seen from Fig. 3 that the cut out 12 of the tumbler (position "4") is to the left of longitudinal axis X—X. (It should be understood that the particular locations of the transversely movable tumblers and dummies shown in Fig. 3 is a haphazard one, due to the movement of the pocketbook as before described). Hence, to align cut out 12 on longitudinal axis X—X, it is required to move the tumbler rightward. This is, of course, done by a rightward movement of the slider, its pin 41 fitting in one of the pockets 11, Fig. 7, of the tumbler. Hence, the first part of the "combination path" may be mapped out; the slider has a longitudinal traverse from position "1" to position "4" and then a transverse rightward traverse on position "4" (to align the cut out on the longitudinal axis, as aforesaid). See dot-and-dash lines, Fig. 3.

An observation may here be made which will make clearer the principle of operation and that is, where it is required to give a tumbler a rightward movement, that tumbler must be approached along the left edge of the casing slot, and vice versa. For example, tumbler of position "4" is required to be shifted rightward; hence the slider approaches it—positions "1" to "4"—along the left side of the casing slot.

Tumbler of position "4" happened to have been in a leftward position as shown. Suppose that this tumbler had been in a rightward position, in which its cut out would already have been properly located on longitudinal axis X—X. In this case it would be impossible for the slider to make the required rightward traverse on position "4", because of the partitions separating the pockets 11, Fig. 7. In such a case, the slider is given its transverse movement in a "spacer" position, it being recalled that the spacer elements 30, Fig. 9, have no slider pin pockets, but instead a wide gap 31. A further observation should here be made and that is, a spacer element 30 is preferably associated—i. e., either before or after—with a tumbler element 10, so that the required transverse may be made, in the event that the tumbler is already in the required position thus blocking the required transversal of the slider. In Fig. 3, the spacer (position "3") precedes the tumbler (position "4"). If it is found that tumbler "4" is already in its required rightward position and the slider cannot therefore be moved to the right, the slider is brought back to spacer "3" and there traversed rightward, as shown by the dotted lines.

If there were only one tumbler, such as "4", the "combination path" would be: A longitudinal traverse along the left position (i. e., along the left edge of the casing slot) from position "1" to position "4", then a rightward traverse on position "4", followed by a final longitudinal traverse along the right position (i. e., along the right edge of the casing slot) from position "4" to position "11" (where the slider is effective to open the lock by abutting lug 61 of the latch bar 60 and moving the same, as already described). In the event that tumbler "4" is already in its required rightward position, the first longitudinal traverse is to position "3", then rightward on spacer "3" and a final longitudinal traverse along the right position, starting from position "3". It is preferable to have at least two tumblers, because if there were but one tumbler and that tumbler happened to be in its correct position, the lock can be readily opened by a simple longitudinal traverse of the slider, without even knowing the combination path. Moreover, when there are two tumblers, these should be arranged so that one of them requires a leftward transversal and the other, a rightward transversal, so that in no circumstances will both be accidentally in opening position. That is, if the bag happened to be laid on its left side, both tumblers will shift (by gravity) to the left, but only one of these will be in correct opening position.

Hence if two tumblers are present, such as tumbler "4" and tumbler "7", Fig. 3, one of them, e. g., the one in position "4", would have a required rightward traverse and the other, in position "7", a required leftward traverse. Mapping out the path already traced, the slider—now in right position (at the right edge of the casing slot) and in position "4"—is moved longitudinally from position "4" to position "7" (dot-and-dash line) where it is found, for example, that tumbler "7" is already in its required leftward position as shown. (It should be noticed that the slider approaches tumbler "7" from the correct direction, i. e., from the right side of the casing slot since the tumbler is required to be moved to the left). Tumbler "7" having been found already in its correct leftward position, the slide continues its longitudinal traverse still along the right edge of the slot, to position "11" where it opens the lock as explained above.

Suppose there is a tumbler, such as the one shown in position "9", following tumbler "7" and suppose this also has a required leftward transverse (i. e., in the same direction as tumbler "7"), tumbler "9" must therefore be approached from the right position (so that the tumbler may be given a leftward transverse). If the previous tumbler "7" is already in its correct (leftward) position, as in the example above assumed, the slide will continue along its right position to position "9" where it is effective to move the tumbler to the left, if not already there. But suppose the previous tumbler "7" had not been in its correct leftward position, but that it is required to be moved to the left for cut out alignment; in this case, the slider is moved to the left transverse position. A right position approach to tumbler "9" being required, the slider must be again shifted transversely from left edge to right edge of the casing slot. This rightward slider movement, of course, cannot be done in position "9", which would result in throwing that tumbler out of alignment. Hence the required rightward transversal must be made along a spacer (either the one in position "6" preceding the tumbler or the one in position "8" following the tumbler). In Fig. 3, this shifting is done in spacer position "8", see the dotted lines.

It is not required that a spacer be associated with each tumbler; that is, it may be possible to make a required transversal shift by moving the slider backward to a previous spacer. For example, there is shown in Fig. 3, a spacer in position "8" followed by two tumblers "9" and "10." We will assume that both tumblers require a leftward transversal shifting. We will trace the slide path in a condition when both tumblers are in a rightward position, i. e., both require a leftward shift. The slider approaches from the right position (right edge of the casing slot). Tumbler "9" is shifted to the leftward. The slider must be again shifted to the right edge position, since the next tumbler is required to be shifted to the left. The slider is brought back to spacer positon "8" where the required rightward shift is made, and the slider moves longitudinal along the right edge of the slot from position "8" to position "10" where the required leftward adjustment of tumbler "10" is consummated (if not already in required position).

The slider 40 may be provided with a pointer 42, Fig. 1, which cooperates with indicia (lines, numerals, letters or the like) designated 4 in Fig. 1, provided on casing or upper plate 1. The casing or upper plate 1 may be further provided with a window 5, Fig. 1, or a pair of such windows, one on each side, wherethrough can be viewed a dot or other indicia on the individual elements, enabling the user to tell at a glance the position of the tumblers. Instead of dots, each of the elements may bear a particular letter so arranged that all the elements when properly arrayed in opening combination will display a feminine name—preferably that of the owner—at the window 5. The elements may bear two letters, in order that the positioning of the elements in the proper arrangement will not be quite so easy. Where the number of elements are greater than the number of letters in a particular name, the end elements may have merely a dot on them.

It might be noted that the combination lock of this invention as here applied to a handbag is not required to be absolutely tamper proof (although locks of this invention may be so made, if desired, even used with handbags).

Instead of, or in addition to, the visible indicia of longitudinal slider position (such as 42 and 4) there may be provided a detent, "click" or sound indication, as shown in Fig. 10. The partitions 13 of the tumblers 10 and the partitions 23 of the dummies which form pockets 11 and 21, respectively, are provided with projections, respectively 14 and 24, projecting on both sides, i. e., in the pockets on both sides of the partition, as clearly shown in Fig. 10. The pin 41 of the slide is split as shown and is formed of springy material tending to spread apart. As the pin moves along in its longitudinal path (e. g., from tumbler 10 to dummy 20, in Fig. 10) it encounters a slight resistance due to the projections 14 on the tumbler (and also by projections 24 on the dummy when passing from 20 to the next element), which operate as a "click" or detent means whereby the user can readily be informed of longitudinal slider position or rather, of the movement from one position to the next. If desired, the indicating means may be arranged to emit a low sound or click to mark longitudinal passage.

If it is desired to keep the bag unlocked (but closed by the clasp 1 in closing abutment with cam surface 52, Fig. 2, as already explained) a notch 6, Fig. 1, may be provided to hold the slider in its rightmost position against the urgency of latch bar spring 63, and also, of course, maintaining the latch bar 60 in its rightmost position; in this position of the latch bar, its latch members 64, see Fig. 6, are rightward and free of the ledges 54 of the bag frame B, Fig. 2, which may therefore be opened.

The ends of the tumbler partitions 13 and dummy partitions 23 are beveled to an edge, see Fig. 3, so that the slider pin 41 will cam the tumblers and dummies to the left or right, to properly position them.

Instead of providing a spacer (30) with each tumbler—as explained, the spacers have no partitions but a wide gap 31, so that no obstruction is offered to the transverse movement of the slider—the tumbler itself may have a "gap" or clearway for the slider pin. As shown in Fig. 11, the tumbler 34 is provided with partitions 33 which do not extend the entire width of the tumbler, but leave a clearance or gap to the right (in Fig. 11) of the partitions, in which the slider pin may be freely transversely shifted. It will also be seen from Fig. 11 that the barrier wall 32 does not extend the entire width of the tumbler, but that a space is provided (to the left of the barrier wall in Fig. 11) for the latch bar fingers, it being understood that the tumblers 34 are arrayed side by side without the interposing of spacers. The dummies to be used would be precisely like tumbler 34, except that they would have no barrier wall.

In Fig. 1, the lock is shown as combined with a clasp. It is manifest that the lock may be applied with or without a clasp. In the said figure, the lock is of a relatively short length compared with the length of the bag frame. It is also manifest that the invention may be applied so as to extend along a greater length of the frame or, if desired, substantially the entire length of the frame.

A second form of the invention is shown in Figs. 12 to 19, which is particularly adapted for such things as drawers, doors, cabinets closets, box covers, and so forth, and is, merely for convenience in exposition, illustrated in connection with a desk lock. Of course, this form of the invention may be applied to the things partially enumerated with reference to the form of the invention shown in Figs. 1 to 11; and, conversely, that form may be suitably applied to desk drawers, cabinet doors and box covers and the other and like things above mentioned.

The drawer C is centrally cut out in the usual manner, Fig. 12, to receive the lock, which is encased in a casing formed of a heavy plate 7 and a somewhat lighter plate 8 which is bent in the form of a rectangular box, see Fig. 14. The plate 7 is provided with rabbets along its top and bottom, see Fig. 14, in which the two ends of plate 8 fit and are securely fastened in a suitable manner. It will be noted, best from Fig. 14, that the top of the casing, 8', is flush with the top edge of the drawer (see also Fig. 12) and that the juncture between the ends of plate 8 and plate 7 are in the inside side of the lock. Top side 8' of the lock is provided with a cutout for the bolt 65 which is receivable in a suitable strike plate 22 in the underside of desk D. (Fig. 12).

The front face of the lock casing is provided with a rather wide longitudinal opening 8s for longitudinal and traverse movement of slider 43, its pin 44 being associated with a shield 53. The shield is provided with a longitudinal slot 53s through which the slider pin 44 passes. The pin is shouldered, as shown in Fig. 14, to anchor the same to the shield, so that the slider may move longitudinally relative to the shield, but in transverse movements of the slider, the shield is moved together with the slide. The shield is made sufficiently wide, Fig. 14, to close the wide opening 8s of the casing in all transverse positions of the slider.

Slider pin 44 is traversable in one or the other pockets 16 provided in a plurality of tumblers 15, or in pockets 26 provided in a plurality of dummies 25. The tumblers and dummies are vertically placed in side by side relation in the casing (the sequence of which depends upon the particular combination); these bear a distinction somewhat similar to that already pointed out. The slider (40) in the first form of the invention (Figs. 1 to 11) had two transverse positions (viz., along either the left or right edge of the longitudinal casing slot); hence the tumblers (10) and dummies (20) had each three pockets (respectively, 11 and 21). The slider 43 in the form of the invention now being considered has three transverse positions, viz., an upper position (along the upper edge of the longitudinal casing slot, Fig. 14), a lower position (along the lower edge) and a central position (intermediate the two); hence, the tumblers and dummies are provided with five pockets each.

The elements (i. e., tumblers and dummies) have a normal position resting upon the bottom of the casing as shown in Figs. 13 and 14. The slider is shown in Fig. 14 in its central position, with its pin in the fourth pocket (counting from the bottom upwardly). In the shown normal position of the tumbler, the slider may be moved to upper position, whereat its pin moves along the fifth pocket, or moved to lower position, whereat its pin moves along the third pocket. The tumblers likewise have three transverse positions, the normal, lowermost position, a middle position and topmost position. If the tumbler is shifted (in Fig. 14) to its middle position, the slider, itself in its lower position, may traverse in the second pocket; if the tumbler is shifted to its topmost position, the slider may traverse the first pocket, etc.

The individual elements may be retained in either their middle or topmost shifted position by means of spring detent fingers 35, there being one finger for each element. The spring fingers depend from a detent bar 36, the ends of the fingers being engageable in the pockets (16 or 26) of the elements, see Figs. 13 and 14.

The slider pockets (26, dummy and 16, tumbler) extend substantially half the width of the elements and are shown on the left side (as viewed in Figs. 13 and 15) thereof. (The slider pockets may extend entirely across the elements, a feature which will be more fully treated subsequently.) At the rear side of the lock, the elements are provided with barrier walls, respectively 17' (tumbler) and 27' (dummy), which, as best seen in Fig. 15, are likewise on the left side of the elements. The barrier walls of the elements are provided with a single cutout or groove, respectively 17 (tumbler) and 27 (dummy) which is provided at one of three levels depending upon the combination of the lock; these three positions are clearly seen in Fig. 14. Cooperative with the elements is an actuator slide 55 or cradle as clearly appears in Fig. 16. The actuator has a rear wall which extends the entire length of the cradle and which is provided with in-turned fingers 57 which in the normal (locking) position of the cradle, see Fig. 15, is to the left of the barrier walls of the elements. The fingers are uniformly spaced corresponding to the pitch or width of the elements, see Figs. 16 and 15 and are equal in number to the elements. The barrier walls of the elements are effective to prevent the rightward movement of the actuator, unless the cutouts (17 and 27) are aligned with the fingers 57—this being the opening combination or proper transverse positioning of the elements.

It was above stated that the elements in their normal, lowermost position, rest upon the bottom of the casing. As a matter of fact, they rest upon the floor of the actuator cradle. (The function of the cradle in maintaining the elements in position will be fully considered subsequently.)

Most of the center portion of the front wall of the actuator cradle is cut away, see Fig. 16 (for one reason, so as to provide clearance for the shield 53, see Figs. 14 and 18), leaving end portions, namely, a left end portion 56L and a right one, 56R. As best seen in Fig. 18, the shield 53 fits not too tightly between the two end portions of the actuator cradle. Also, the end portions are made sufficiently high so that the shield and the end pieces are always in abutment in all transverse positions of the shield (i. e., the slider). The actuator cradle is somewhat shorter than the length of the lock casing, so that it has an extent of longitudinal movement. Spanning the cradle at the left end is a tongue 58, conveniently punched out of the rear wall, see Fig. 16, and abutting, or fastened to, the left end portion 56L; a similar tongue 58 is provided at the right. The tongues 58 pass through slots 68 provided in the left leg 67L and right leg 67R of a bolt plate 66, see Fig. 17, in the form of an inverted U, the web portion forming the bolt 65. The length of bolt plate 66, from the left edge of its left leg 67L to the right edge of right leg 67R, is such that the plate fits snugly in the lock casing, in which it has, of course, a vertical movement for bolting purpose, as will be understood. The bolt plate is shown in Figs. 13 and 14 in extended (upward) bolting position; it will be observed from Fig. 13 that the legs 67R and 67L are sufficiently short to permit retraction of the bolt plate within the casing.

The widths of the legs 67R and 67L and the center span or opening of the plate are such that the legs fit on the respective sides (left and right) of the element assembly, which fits in the center clearance, see Figs. 15 and 13. Thus the bolt plate serves (together with actuator cradle 55) to position the elements within the casing.

The actuator cradle is shown in Figs. 13, 15 and 18 in its leftmost position, with the bolt in extended locking position and with the fingers 57 of the actuator blocked by some (or all) of the elements, more particularly, by their barrier walls. In opening the device, the slider is moved rightward to the successive element (i. e., tumbler) position, and is moved transversely to properly adjust the individual tumblers, so that their cutouts 17 are aligned at the level of the cutout fingers 57. The elements are retained in adjusted position by the spring detent fingers 35.

It will be observed from Fig. 18 that when the slider is at the last (rightmost) element, it is also at the end of the slot 53s of its shield 53. If the elements had not been properly adjusted, further rightward movement of the slider (and its shield) is prevented by the actuator cradle, or rather, by reason of the fingers of the actuator being blocked by the barrier walls of improperly positioned elements. If, on the other hand, the element cutouts had been properly aligned, further rightward movement of the slider and shield moves the actuator cradle with them. This rightward movement of the actuator is effective (by reason of the cooperation of the cradle tongues 58 in the inclined slots 68 of the bolt plate) to retract the bolt downwardly to opening position.

The bolt may be locked by moving the slider (which moves the shield and cradle, as described) to the left. In returning the slider leftward, its pin traverses the element pockets in a horizontal line. The "combination" remains unlocked (unless the slider is brought to the extreme left, as will be presently described) as the slider is returned leftward—to extend the bolt upwardly to locking position—by reason of the fact that the detent fingers still retain the elements in the adjusted opening alignment. Thus the device may be used to throw and retract the bolt without "locking" the combination. As the device is designed in the accompanying drawings, the elements remain in open aligned condition even with the slider brought as far to the left as the leftmost (or first) element. Further leftward movement of the slider is effective to "lock" the elements, as will now be described.

Depending from the left end of the detent bar 36, see Fig. 13, is a leg 37. The detent bar has a slight extent or longitudinal movement in the casing and is normally urged by a spring 38 in a rightward direction ( as viewed in Fig. 13) to normally maintain its detent fingers in operative relation, as shown in this figure, to the element pockets. The detent bar 36 is in the same plane as the shield 53, see Fig. 14. The dependent leg 37, therefore, is given a slight offset, see Fig. 15, to bring its lower end behind the shield and in position to be contacted by the pin 44 of the slider. As the slider is moved leftward from a position at the leftmost or first element, its pin contacts leg 37 and moves the detent bar 36 to the left, which is effective to withdraw its detent fingers 35 (to the left) from holding engagement in the element pockets. The actuator fingers 57 pass leftward through the still aligned element cutouts. At the time the fingers have cleared the cutouts, the detent had already cleared the pockets (the detents being somewhat narrower than the fingers), so that the elements immediately drop to normal, bottommost position, resting on the floor of the cradle. Also, the detent bar, by reason of its spring 38, which was compressed by the leftward movement of the bar, immediately returns to the right, in operative position ready for the next manipulation. The cradle, however, remains in its left position, by reason of the blocking of its fingers by the elements (now in their normal, unaligned positions).

The left bottom ends of the diagonal slots 68 have short horizontal portions 68', so that the cradle may move leftward (to release the detent bar, as just described) without affecting the bolt plate. The left leg 67L of the bolt plate is provided with clearance 69 for the detent bar leg 37 and slider pin 44. The spring 38 may be made sufficiently stiff to serve also as an impositive stop for the slider, so that a person may lock the bolt but not the combination, by moving the slider leftward until abutment with the spring 38. Greater force is now required to force the slider further leftward to release the detent bar fingers and to lock the combination, as described.

In the figures the element pockets are shown as extending only half way across the width of the elements, thus leaving a clear space (at the right of each element) for free transversal of the slider (i. e., without affecting the element position). By providing this free passage for the slider, it may be brought back to lower slide position (at the bottom edge of casing slide 8s) at any position in its longitudinal traverse; in this manner, a greater number and variety of combinational paths are made possible. If, on the other hand, the pockets extend entirely across the elements, the slide cannot be returned downward, but can only be moved upward (together with the elements), so that only two upward traverses are possible.

Although one group of elements have been termed tumblers and the other, dummies, these are practically the same, the only difference being the position of the cutout in the barrier walls. In the case of dummy elements, the cutouts may be placed at the third upper position (Fig. 14) so that in the normal position of the dummies, their cutouts are already aligned with the actuator fingers. Hence, such dummy elements must not be disturbed from normal position. Or, the barrier wall may be eliminated entirely from the dummies, so that they have no blocking effect in any adjusted position.

The slider may be provided with appropriate detent, click or visible indication (such as described in connection with Figs. 1 to 11). It should be observed that the slider pockets 16 (26) together with detent springs 35 serve as a click or detent gauge in vertical movement of the slider; by forming the slider pin and the pocket partitions in the manner shown in Fig. 10, a click or detent (or sound) gauge may be readily provided for longitudinal movement of the slider.

The invention of the previous figures may be applied to a padlock as shown in Figure 19, wherein the casing opening is designated 8s' the slider, 43', the shield 53', the shield slot, 53s' and the shackle is designated 39.

Figure 21:
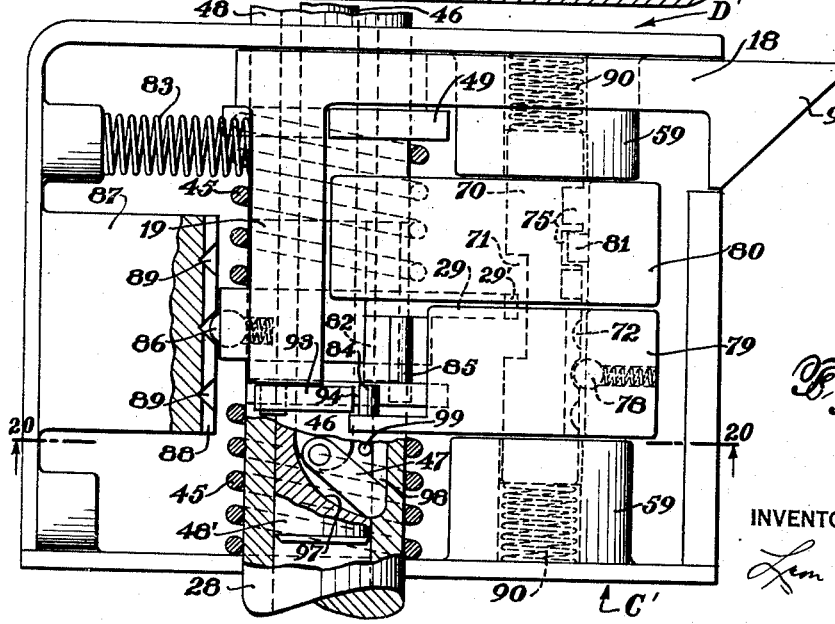
Fig. 21 is a sectionalized plan view of the same.

A further form of the invention is shown in Figs. 20 and 21, applied to a door mechanism. This is the usual type of door fixture in which a beveled bolt 9 at the end of a bolt plate 18 cooperates with a strike plate on the door jamb (not shown). The bolt plate is operated by door knobs (not shown), there being a knob on the outside side C' of the door (see Fig. 21) and a knob on the inside side D'. The outside knob (i. e., the one on the outside side of the door—the "outside" being the side from which the door cannot ordinarily be operated unless the combination is known) is securely mounted on a spindle 28; the inside knob is securely mounted on a spindle 48, both spindles being axially mounted in the usual manner.

Also securely mounted on spindle 28 is an arm 29 having a finger 29'. Arm 29, or rather its finger 29', is cooperative with a plurality of tumblers or elements 70, which are arranged in an arc of a circle, the center of which is at the center of knob spindles. Eight elements are shown in Fig. 20 but, of course, the number is an arbitrary consideration. By turning the outside door knob, the arm 29 may be brought into alignment with successive or selective ones of the elements 70. Each of the elements are provided with a wide recess 71 in which is received the arm finger 29'. The ends of the elements (which are parallel to the door spindles, see Fig. 21) are supported in sockets in a member 59 provided on the outside and inside walls of the device. A small coil spring 90 in each socket i. e., at both ends of the element, tends to (normally) keep the element in centered position (as shown in Fig. 21).

In addition to the angular turning of the outside knob and arm 29 (for one thing, for alignment with the tumbler elements 70, as described), the outside knob (together with its spindle 28 and arm 29) has an axial movement to a slight extent (to adjust the individual elements according to the "combination", as will be described). The arm 29 is shown in Fig. 21 in its central position, midway in the element recess 71. The outside knob is adapted to be moved rearwardly (upwardly, Fig. 21, in the drawing) to contact the (upper) wall of the recess (of the particular element with which the arm happens to be angularly aligned) and to move the said element rearwardly (upwardly in Fig. 21); the knob by being pulled outwardly causes the arm to adjust the element in the forward direction. Both adjusting movements of the elements are against the centering springs 90. To maintain the elements in either of its adjusted positions, is provided a detent member 79 in the form of a crescent, Fig. 20, provided with a plurality of spring-pressed detent balls 78, equal to, and spaced in accordance with, the tumbler elements. The detent balls are receivable in detent cups 72 provided along the surface of the elements. Inasmuch as there are three axial positions of the elements (rearward, center and forward) there are provided three cups 72, see Fig. 21.

All or some of the tumbler elements are provided with a single cutout 75 located on the different elements according to the particular "combination." Cooperative with the said tumbler cutouts are a plurality of fingers 81 projecting inwardly from the inner face of an actuator 80, which (like detent member 70) is in the form of a crescent. Conveniently the two crescent members 79 and 80 are placed side by side, Fig. 21, between socket members 59. The surface of the elements provided with the said cutouts 75, is formed so as to provide a barrier wall 76 and a recess 77, see Fig. 20. The fingers 81 of the actuator are normally positioned in the recesses 77 of the elements and are, in the locked condition of the device, blocked against movement (in either direction) by the barrier walls 76 of the elements; the elements may thus be collinearly adjusted by the arm 29, as already described.

Although but three axial or collinear adjusting positions of the elements are shown in the drawings, it is clear that the number of such positions may be made less than or greater than this number, and, instead of the single wide tumbler recess 71, the elements may be provided with a plurality of pockets as described in connection with the forms of the invention shown in Figs. 1 to 19.

To facilitate the positioning of the arm (i. e., manipulative knob) and to serve as a detent or click means, there is provided a detent "grid" for the three axial positions, Fig. 20. The grid is formed by the intersection of three V-slots 89, Fig. 21, in the form of part of a circle, see Fig. 20, and eight axially oriented V-slots 88; the two series of V-slots are formed in a grid block 87. Cooperative with the said series of V-slots, or rather with the intersections thereof, is a spring-pressed ball 86 on the hub of the arm 29 and placed diametrically opposite its finger 29'.

The ends of the crescent-like actuator 80 abut an upper and lower post 19 extending from the bolt plate 18. Near each end of the actuator and projecting from its inner surfaces is a rail 82 contactable by the arm 29, see Fig. 20. As shown in Fig. 21, the rail 82 extends beyond the actuator 80 to underly most of the width of the detent member 79; the rail is thus made sufficiently long to be contacted by the arm 29 in all (three) axial positions thereof.

The bolt 9, which is normally pressed outwardly (as shown) by coil springs 83 placed at the rear of the bolt plate posts 19, may be withdrawn by turning of the door knobs in either direction. Assuming for the moment that the tumbler elements are adjusted in unblocking position so that the actuator fingers 81 may pass freely through the cutouts 75 in the barrier walls 76 of the elements, the outside door knob may be turned in either direction to withdraw the bolt: by turning the knob in a counterclockwise direction arm 29 will contact the upper rail 82 of the actuator 80 to turn the same counterclockwise, the upper end of the actuator pushing the upper post 19 of the bolt plate rearwardly (to the left in the figures). By turning the knob clockwise, arm 29 contacts the lower rail 82 to turn the actuator clockwise, its lower end pushing the lower post 19 rearward.

The elements are adjusted (according to the predetermined "combination") in the proper collinear position by turning the arm (i. e., knob) preferably in a clockwise direction, successively from tumbler to tumbler. To facilitate the axial movement of the knob, a pair of coil springs 45 are provided on each side of the arm 29 to center the same (and the door knob) to the position shown in Fig. 21. Thus, if it is desired to adjust a tumbler element in a forward position, the door knob is simply pulled forward, against the spring 45 at the front (outside side) of the door.

During the manipulation of the outside door knob in "opening the combination", the detent member 79 is in position effective to retain the individual tumblers in whatever collinear position they are adjusted by arm 29. However, after the door is opened and it is again desired to lock it, the detent member is moved from its said effective position to a position in which its detent-balls 78 are no longer effective to hold the tumbler elements against the centering springs 90. It will be seen from Fig. 20 that the detent cups 72 are positioned on a raised portion 73 of the elements and that to one side thereof is a recess 74 in which the detent-ball 78 is ineffective to hold the elements against their centering springs. The detent member 79 itself is capable of a slight extent of rotational movement and is normally urged by a coil spring 91, Fig. 20, in a counterclockwise direction. One end of spring 91 is anchored (not shown) in the casing and its other end abuts a pin 92 provided on the detent member 79.

The detent member is thus urged by spring 91 in a counterclockwise direction, i. e., spring 91 tends to move the detent member to place its spring-pressed balls 78 at the raised portions 73 of the tumbler elements, where they are effective to hold the tumblers in adjusted positions. However, after the lock is operated and the combination "opened" by properly adjusting the tumbler elements according to the "combination", it is necessary to disarrange the elements to destroy the combination, which is done by moving the detent member to its ineffective position (shown in Fig. 20) to allow the elements to be centered by their centering springs 90. For this purpose there is pivoted on the upper bolt post 19 a small bell-crank dog 93 frictionally mounted so as to be adjustable from the solid line position shown in Fig. 20, with its horizontal leg contactable with a pin 84 provided at the upper end of the detent member, to the dot-and-dash position, in which it overlies the said pin 84. There is also provided a lever 94 pivoted to the casing at 94a, Fig. 20. The distal end of lever 94 has a cam surface overlying a pin 85 on the arm 29. Lever 94 is further provided with an upstanding lug 95 underlying the bell-crank dog 93, or rather, its horizontal leg.

Preparatory to the working of the combination (which, as already stated, is most conveniently done in a clockwise direction), the arm 29 (i. e., the outside door knob) is moved counterclockwise (as viewed in Fig. 20) as far as possible until stopped by upper rail 82 of the actuator 80, which is itself blocked against movement by the tumbler elements. In this counterclockwise movement of the arm its pin 85 raises lever 94 to cause lug 95 to raise the dog 93, or rather its horizontal leg, from abutment with pin 84 of the detent member. It should be mentioned that the horizontal leg of the dog when in abutting position with pin 84 prevents spring 91 from moving the detent member counterclockwise to effective position; i. e., the dog 93 keeps the detent member in ineffective position as shown in Fig. 20. Hence, preparatory to the starting of a combination cycle, arm 29 raises dog 93 from abutment with pin 84, thus allowing spring 91 to move the detent member to effective tumble holding position. Hence, when the elements are adjusted collinearly (as already described) the detent member will hold them in adjusted position.

The dog 93 remains, by reason of its frictional mounting, in raised position. Somewhat to the left of the bolt post 19 and dog 93, is provided a stop 96, Fig. 20, which is effective, by abutment with the vertical leg of the dog 93, to turn the dog clockwise to again place its horizontal leg in position to abut pin 84. Hence, when the bolt and bolt plate 18 returns, by force of the compressed springs 83, rightward (as viewed in Fig. 20) its dogs 93 will, by abutment with pin 84, turn the detent member clockwise to its ineffective position (as shown in Fig. 2). Hence, after the bolt is again projected, the tumblers return to their normal centered position, in which the "combination" is destroyed.

There is securely mounted on the spindle 48 to which the inside door knob is secured, a spider 49 having a pair of arms contactable with the posts 19 of the bolt plate, so that the inside knob may directly operate the bolt (independently of the actuator 80, tumblers 70, etc.).

It may be desirable to be able to open the door bolt from the outside side C' (Fig. 21) of the door without the need of setting the tumblers in combination positions. For this purpose there is provided a rod 46 movable to a slight extent within the spindle 48 and within an extension 48' thereof which is received in a center bore of spindle 28, see Fig. 21. At the forward end of rod 46 is pivoted a key dog 47. At the forward end of the key way is formed a cammed surface 97 which, when the rod 46 is moved forward, causes dog 47 to be turned out. When so turned out key dog 47 is received in a keyway 98 in spindle 28 and hence the outside door is thus coupled to the spindle 48 and may directly operate the bolt by means of spider 49 which, as already described, is secured to spindle 48. It should be noted from Fig. 20 that the keyway 98 is precisely centrally located relative to arm 29, more particularly, finger 29'. Hence, when spindle 28 and its arm 29 are coupled to the "inside" spindle 48 and its spider 49, see Fig. 20, the arm 29 will be midway between upper rail 82 and lower rail 82 of the actuator; thus, the outside door knob may be turned a sufficient extent in either a clockwise or counterclockwise direction to cause spider 49 (to which it is now coupled) to withdraw the bolt before arm 29 reaches the rails 82 to become blocked thereby. To uncouple the outside knob from the inside spindle 48 and spider 49, rod 46 is simply pulled rearwardly (upwardly in Fig. 21) to cause its key dog 47 to be withdrawn by contact with a pin 99. The rod 46 is manipulative from the inside side of the door by appropriate means of the usual kind (not shown) which may be provided with a spring (not shown) which is compressed, when the rod catch is moved outwardly, to force key dog 47 into keyway 98 when the outside door knob and arm 29, see Fig. 20, passes the midway point.

I claim:

1. In a device of the class described, in combination, a latch mechanism capable of a latched and unlatched condition comprising a latch bar, a casing, a permutation mechanism capable of a clear and a blocking condition comprising a plurality of elements arranged in side by side relation in the said casing and adjustable to different positions, a manipulative member movable generally in a forward direction to be selectively aligned with the said elements and to adjust individual elements thereof, and contactable with the said latch bar, the movement of the said bar in the said forward direction being effective to unlatch the device, further forward movement of the said manipulative member being normally blocked by the said elements in the blocking condition of the permutation mechanism whereby the said latch bar is retained against forward unlatching movement, the said elements being adapted to be adjusted to pre-determined positions in which the permutation mechanism is in clear condition, whereby the said manipulative member is capable of a further forward movement to unlatch the device, means normally in a position effective to retain the elements in said adjusted positions whereby the movement of the said manipulative member in the return direction will not be prevented by the said elements, the latch mechanism remaining in unlatched condition and the permutation mechanism remaining in clear condition during the said return movement of the manipulative member, the manipulative member being adapted at the end of its said return movement to move the said retaining means from its said effective position, whereby the elements move from the said predetermined positions to render the permutation mechanism in blocking condition.

2. The combination according to claim 1 wherein the said retaining means is maintained in said effective position by a spring, said spring being contactable by the said manipulative member at the end of its said return movement and sufficiently strong to serve as an impositive stop for the manipulative member to keep the permutation mechanism in clear condition.

3. In a device of the class described, in combination, a latch mechanism capable of a latched and unlatched condition comprising a latch bar, a casing, a permutation mechanism capable of a clear and blocking condition comprising a plurality of elements arranged in side by side relation in the said casing and adjustable to different positions, a manipulative member movable generally in a forward direction to be selectively aligned with the said elements and to adjust individual elements thereof, and contactable with the said latch bar, the movement of the said bar in the said forward direction being effective to unlatch the device, further forward movement of the said manipulative member being normally blocked by the said elements in the blocking condition of the permutation mechanism whereby the said latch bar is retained against forward unlatching movement, the said elements being adapted to be adjusted to pre-determined positions in which the permutation mechanism is in clear condition, whereby the said manipulative member is capable of a further forward movement to unlatch the device, and means for retaining the elements in said adjusted position whereby the movement of the said manipulative member in the return direction will not be prevented by the said elements.

4. In a device of the class described, a casing provided with a longitudinal opening, a shield therefor provided with a longitudinal slot considerably narrower than the said casing opening, a latch member longitudinally movable in the said casing to a slight extent, and having upstanding portions at both ends, the said shield being held between the said portions so as to move with the latch member and adapted to be transversely moved relative to the said latch member, the said shield being sufficiently wide to cover the said casing opening throughout the said transverse movement of the shield, the shield and the said upstanding latch member portions being of sufficient size to cover the said casing opening throughout the said longitudinal movement of the latch member, and a manipulative member having a reduced portion received in the said shield slot, the length of slot being such that the said manipulative member upon reaching either end is effective to move the shield and the latch member the said slight extent longitudinally in any transverse position of the said manipulative member.

5. In a device of the class described, in combination, a latch mechanism capable of a latched and unlatched condition, a casing, a permutation mechanism capable of a clear and a blocking condition, comprising a plurality of elements arranged in side by side relation in the said casing and adjustable to different positions, and a manipulative member movable generally in a forward direction to be selectively aligned with the said elements and to adjust individual elements thereof, further forward movement of the said member being normally blocked by the said elements in the blocking condition of the permutation mechanism whereby the latch mechanism is retained in latched condition, the said elements being adapted to be adjusted to pre-determined positions in which the permutation mechanism is in clear condition, whereby the said manipulative member is capable of a further forward movement to unlatch the device.

6. In a device of the class described, in combination, a casing, a plurality of elements arranged in side by side relation in the said casing, the elements being adapted to be adjusted to different collinear positions, a manipulative member adapted to be selectively aligned with the said elements and to adjust them to selective collinear positions, detent means for holding the elements in adjusted position, and a latch operable when the said elements have been adjusted in pre-determined collinear positions, the said elements being vertically oriented whereby they fall by gravity when the said detent means is withdrawn, to normal rest positions in which the said pre-determined collinear positions are disarranged.

7. In a closure device for a receptacle or the like having an open and a shut condition, in combination, means for holding the receptacle in shut condition comprising a plate in the form of a casing mounted on one part of the receptacle, the distal end of the casing-plate cooperating with the other part of the receptacle to maintain the same shut, a latch means comprising a latch bar mounted in the distal end of the said plate for an extent of longitudinal movement and cooperative with a catch provided on the said other part of the receptacle to latch the same, whereby when the said latch means is in unlatched condition the receptacle may be opened or shut by operation of the said holding means, and permutation means comprising a plurality of elements arranged in side by side relation in the said casing-plate, the said elements being adapted to be adjusted to different positions, and a manipulative member slidably mounted in the said casing-plate and movable relatively to the said elements to adjust them in pre-determined positions in which the permutation means is in clear condition permitting unlatching movement of the said latch bar, whereby the said latch means may be latched or unlatched to open or shut the receptacle.

8. In a closure device for a receptacle or the like having an open and a shut condition, in combination, means for holding the receptacle in shut condition, a latch means associated with the said holding means and capable of latching and unlatching the same, whereby when the latch means is in unlatched condition, the receptacle may be opened or shut by operation of the said holding means, and a permutation means associated with the two said means including an element having a translational movement, normally in a blocking condition relative to the said latch means and transformed into a clear condition by a predetermined translational movement of the said element whereby when the said permutation means is in clear condition the latch means may be latched or unlatched to open or shut the receptacle.

9. In a device of the class described, in combination, a casing having a longitudinal axis and an arcuate section, a plurality of arcuate shaped elements arranged in side by side relation in the said casing, the length of the elements being less than the width of the casing whereby the elements may be adjusted to different collinear positions, a manipulative member adapted to be selectively aligned with the said elements and to adjust them to selective collinear positions, the said elements being freely collinearly movable in the casing whereby movement or jarring of the device will haphazardly disarrange the collinear adjustment of the said elements, the arcuate shape of the elements and the casing causing the elements to temporarily remain in adjusted position to one side or the other of the longitudinal axis of the casing.

10. In a device of the class described, in combination, a latch mechanism capable of a latched and unlatched condition, a casing, a permutation mechanism capable of an open and a closed condition, comprising a plurality of elements arranged in side by side relation in the said casing and adjustable to different positions, a manipulative member movable in either direction to be selectively aligned with the said elements and to adjust individual elements thereof, further movement of the said member in either direction being blocked by the said elements in the closed condition of the permutation mechanism whereby the latch mechanism is retained in latched condition, the said elements being adapted to be adjusted to pre-determined positions in which the permutation mechanism is in open condition, whereby the said manipulative member is capable of a further movement in either direction in the open condition of the permutation mechanism, to unlatch the device.

11. In a device of the class described, in combination, a casing, a plurality of elements arranged in side by side relation in the said casing adapted to be adjusted to different collinear positions, a manipulative member adapted to be selectively aligned with the said elements and to adjust them to selective collinear positions, detent means for holding the elements in adjusted position, a latch operable when the said elements have been adjusted in pre-determined collinear positions, and spring means tending to center the said elements whereby when the said detent means is withdrawn the said elements return to normal centered positions in which the said pre-determined collinear positions are disarranged.

12. In a device of the class described, in combination, a casing, a spindle rotatably mounted in the said casing, a door knob and an arm securely mounted on the said spindle, a plurality of elements each having a cutout arranged in side by side relation in the said casing, an actuator having a plurality of fingers, each of the said elements being adapted to be adjusted to different collinear positions, in one of which positions its cutout is aligned with the said fingers, the said door knob being adapted to be turned to successive angular positions to selectively align the said arm with the said elements and adapted to be axially moved to cause the said arm to adjust the elements to selective collinear positions, and a latch bolt operated by the said actuator.

13. The combination according to claim 12 wherein the said actuator is provided with a lug near each end contactable by the said arm when the door knob is turned in either direction and wherein the said latch bolt is provided with a projection contactable by either end of the said actuator whereby the said knob, when the said elements have been adjusted to permit passage of the actuator, is adapted to withdraw the bolt in either direction of turning.

14. The combination according to claim 12 wherein the said door knob is provided on the outside side of the door and wherein there is further provided a knob on the inside side of the door, the said inside knob being adapted to directly operate the said latch bolt, the combination being further provided with means manipulative from the inside side of the door for coupling the said outside knob directly with the said latch bolt whereby the door may be opened from the outside without adjusting the said elements.

15. In a device of the class described, in combination, a casing, a plurality of elements each having a cutout arranged in side by side relation in the said casing, a latch bar having a plurality of fingers, each of the said elements being adapted to be adjusted to different collinear positions, in one of which positions its cutout is aligned with the said fingers, and a manipulative member unremovably associated with the said device adapted to be selectively aligned with the said elements and to adjust them to selective collinear positions, the said latch bar being movable in opening direction when the said elements have been adjusted in pre-determined collinear positions with their said cutouts aligned with the said latch bar fingers.

16. In a device of the class described, in combination, a casing, a plurality of elements each having a cutout arranged in side by side relation in the said casing, a latch bar having a plurality of fingers, each of the said elements being adapted to be adjusted to different collinear positions, in one of which positions its cutout is aligned with the said fingers, and a manipulative member adapted to be selectively aligned with the said elements and to adjust them to selective collinear positions, the said latch bar being movable in opening direction by the said manipulative member when the said elements have been adjusted in pre-determined collinear positions with their said cutouts aligned with the said latch bar fingers.

17. In a device of the class described, in combination, a casing, a latch bar movable longitudinally in the said casing to a slight extent, to unlatch the said device, a manipulative member movable longitudinally across the entire extent of the said casing and contactable with the said latch bar, permutation elements settable by the said manipulative member in unblocking positions and normally effective to block the said movement of the latch bar, means for retaining the said elements in said set positions, the said means being actuatable by the said manipulative member to release the elements from unblocking positions whereby the said latch bar is blocked against movement, the said manipulative member being freely movable at all times to adjust the said permutation elements.

18. In a device of the class described, in combination, a casing, a plurality of elements arranged in side by side relation in the said casing, the elements being adapted to be collinearly adjusted to positions in either direction from a central normal position, a minipulative member adapted to be selectively aligned with the said elements and to adjust them to selective collinear positions in either direction from the said central normal position, a latch, and means operable by the said manipulative member when the said elements have been adjusted in pre-determined collinear positions, for opening the said latch.

19. In a device of the class described, a casing provided with a longitudinal opening, a shield therefor provided with a longitudinal slot considerably narrower than the said casing opening, a latch member longitudinally movable in the said casing to a slight extent, and having upstanding portions at both ends, the said shield being held between the said portions so as to move longitudinal with the said latch member and adapted to be transversely moved relative to the said latch member, the said shield being sufficiently wide to cover the said casing opening throughout the said transverse movement of the shield, the shield and the said upstanding latch member portions being of sufficient size to cover the said casing opening throughout the said longitudinal movement of the latch member, permutation elements contained with the casing and concealed by the said shield, and a manipulative member having a neck portion passing through said shield slot, and operatively and selectively associated with the said permutation elements, the length of slot being such that the said member upon reaching either end is effective to move the shield and the latch member the said slight extent longitudinally if the said permutation elements have been adjusted by the said manipulative member to permit movement of the said latch member.

20. In a device of the class described, in combination, a casing, a plurality of elements each having a cutout, arranged in side by side relation in the said casing, a latch bar having a plurality of fingers and a projecting lug, the said elements being adapted to be adjusted to different collinear positions, in one of which positions its cutout is aligned with the said fingers, and a manipulative member adapted to be selectively aligned with the said elements and to adjust them to selective collinear positions, and contactable with the lug of the latch bar to move the bar in opening direction when the said elements have been adjusted in pre-determined collinear positions with their said cutouts aligned with the said latch bar fingers, to permit movement of the latch bar in the said direction.

21. The combination according to claim 20 wherein the said latch bar is provided with a spring tending to urge the bar in latching direction.

22. In a device of the class described, in combination, a casing, a plurality of elements each having a cutout, arranged in side by side relation in the said casing, a latch bar having a plurality of fingers and a projection at each end, the said elements being adapted to be adjusted to different collinear positions, in one of which positions its cutout is aligned with the said fingers, and a manipulative member adapted to be selectively aligned with the said elements and to adjust them to selective collinear positions, and contactable with one of the said pair of projections of the latch bar to move the bar in opening directly when the said elements have been adjusted in pre-determined collinear positions with their said cutouts aligned with the said latch bar fingers, and contactable with the other one of the said pair of projections to move the bar in latching direction.

23. In a device of the class described, in combination, a casing, a plurality of elements arranged in side by side relation in the said casing, some of the elements having a barrier provided with a cutout, a latch bar having a plurality of fingers contactable by the said barriers, the said elements being adapted to be adjusted to different collinear positions, in one of which positions the cutout of those of the elements having a barrier is aligned with the said fingers, those of the elements not provided with barriers being not contactable by the said fingers, and a manipulative member adapted to be selectively aligned with the said elements and to adjust them to selective collinear positions, the said latch bar being movable in opening direction when the said elements provided with barriers have been adjusted in pre-determined collinear positions with their said cutouts aligned with the said latch bar fingers.

24. In a device of the class described, in combination, a casing, a plurality of elements arranged in side by side relation in the said casing, the elements being adapted to be adjusted to different collinear positions, a manipulative member adapted to be selectively aligned with the said elements and to adjust them to selective collinear positions, detent means for holding the elements in adjusted position, a latch operable when the said elements have been adjusted in pre-determined collinear positions, and means for gauging the aligning movement of the manipulative member, the said detent means being adapted to gauge the adjusting movement of the said member.

25. In a device of the class described, in combination, a casing, a plurality of elements arranged in side by side relation in the said casing, the elements being adapted to be adjusted to different collinear positions, a manipulative member adapted to be selectively aligned with the said elements and to adjust them to selective collinear positions, a latch, means operable by the said manipulative member when the said elements have been adjusted in predetermined collinear positions, for opening the said latch, and means for gauging the aligning movement of the manipulative member.

26. In a device of the class described, in combination, a casing provided with a longitudinal slot, a plurality of elements each having a cutout, arranged in side by side relation in the said casing, a latch bar having a plurality of fingers, the said elements being adjustable to one or the other of two collinear positions in one of which its cutut is aligned with the said fingers, and a manipulative member longitudinally and transversely movable in the said casing slot, the width of the said slot corresponding to two collinear positional adjustments, the said elements being provided with three pockets whereby at least two pockets will be exposed at the said slot to always afford the said manipulative member free longitudinal passage, the sides of the said casing slot serving as a transverse positional guide for the said manipulative member.

27. In a device of the class described, in combination, a casing provided with a longitudinal slot, a plurality of elements each having a cutout, arranged in side by side relation in the said casing, a latch bar having a plurality of fingers, the said elements being adjustable to one or the other of three collinear positions in one of which its cutout is aligned with the said fingers, and a manipulative member longitudinally and transversely movable in the said casing slot, the width of the said slot corresponding to three collinear positional adjustments, tht said elements being provided with five pockets whereby at least three pockets will be exposed at the said slot to always afford the said manipulative member free longitudinal passage.

28. In a device of the class described, in combination, a casing, a plurality of elements each having a cutout and a plurality of pockets, arranged in a side by side array in the said casing, a latch bar having a plurality of fingers, the said elements being adapted to be adjusted to different collinear positions, in one of which positions its cutout is aligned with the said fingers, and a manipulative member afforded passage by the said element pockets to traverse longitudinally across said array of elements in a predetermined direction to be selectively aligned with the said elements and adapted by abutment with the sides of the element pockets to adjust the element to selective collinear positions, the said latch bar being movable in opening direction when the said elements have been adjusted in pre-determined collinear positions with their respective cutouts aligned with the said latch bar fingers, the said manipulative member being freely returnable in a direction opposite to the said pre-determined direction by passage through the pockets of the said elements.

29. In a device of the class described, in combination, a casing, a plurality of elements each having a cutout and a plurality of pockets, arranged in a side by side array in the said casing, a latch bar having a plurality of fingers, the said elements being adapted to be adjusted to different collinear positions, in one of which positions its cutout is aligned with the said fingers, and a manipulative member afforded free passage by the said element pockets to traverse longitudinally across said array of elements in a pre-determined direction to be selectively aligned wth the said elements and adapted by abutment with the sides of the element pockets to adjust the element to selective collinear positions, the said pockets not extending entirely across the width of the elements so as to leave a clearance for the free movement of the said manipulative member collinearly of the elements but without imparting movement thereto, the said latch bar being movable in opening direction when the said elements have been adjusted in pre-determined collinear positions with their respective cutouts aligned with the said latch bar fingers, and the said manipulative member being freely returnable in a direction opposite to the said pre-determined direction by passage through the pockets of the said elements.

LEON H. AMDUR.